G. W. Rogers.
Rotary Pump.

N° 89,080. Patented Apr. 20, 1869.

Witnesses:
Isaac R. Oakford.
Henry Roellig.

Inventor:
G. W. Rogers
by Chas. F. Evans
Atty.

UNITED STATES PATENT OFFICE.

G. W. ROGERS, OF PHILADELPHIA, PENNSYLVANIA.

IMPROVEMENT IN ROTARY PUMPS.

Specification forming part of Letters Patent No. 89,080, dated April 20, 1869; antedated April 3, 1869.

*To all whom it may concern:*

Be it known that I, GEORGE W. ROGERS, of the city of Philadelphia, county of Philadelphia, and State of Pennsylvania, have invented a new and useful Improvement in Pumps; and I do hereby declare that the following is a full, clear, and exact description of the construction and operation of the same, reference being had to the accompanying drawings, making a part of this specification, in which—

Figure 2:
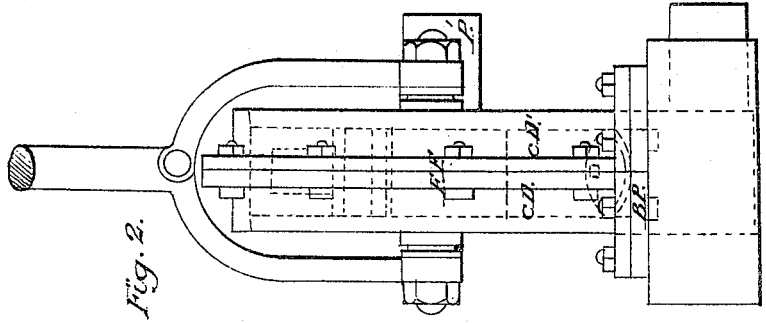
Figure 3:
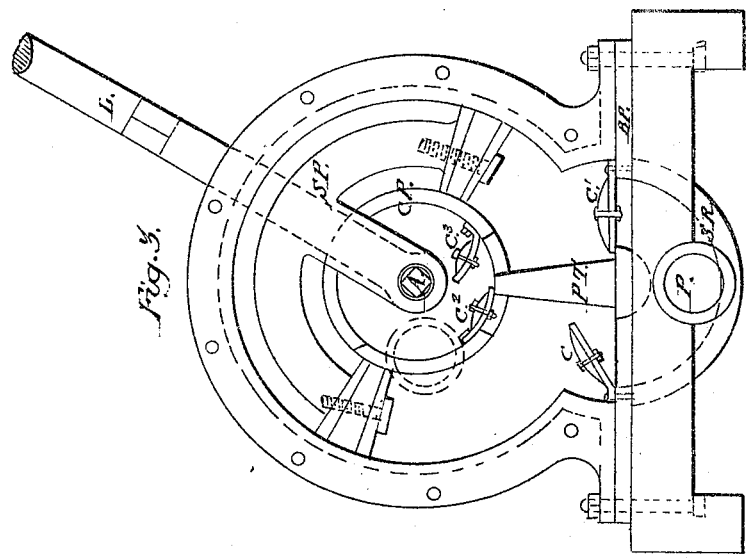
Figure 1:
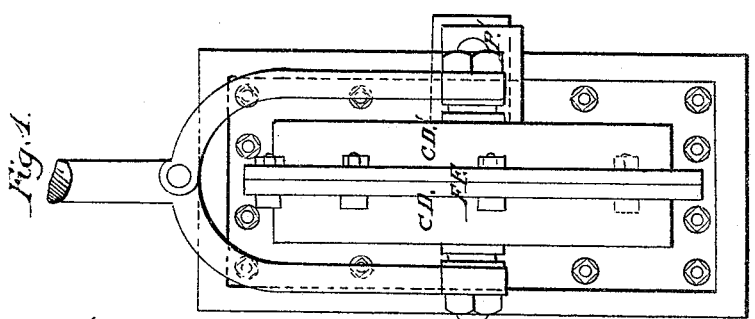

Figure 1 is a top view of my pump. Fig. 2 is an end elevation of same. Fig. 3 is a section of side elevation of same.

The nature of my invention consists in constructing a rotary pump, as hereinafter described, so as to combine compactness, simplicity, and cheapness with greatly-increased power over the present style of pumps now in use.

To enable others skilled in the art to make and use my invention, I will now proceed to describe its construction and operation.

The pump consists of four distinct parts, as follows: circular disks C D and C D', bed-plate B P, and segmental piston S P.

The bed-plate B P is made flat on top, and the under part in any desired form. On top and off from the center are made two circular openings, which are covered by clack-valves C and C¹. Said openings open into a suction-reservoir, S R, formed on the bottom. On the side of the reservoir S R is another opening, in which is placed the suction-pipe P.

Circular disks C D and C D' are provided with flanges F. Said flanges continue down so as to form a foot or stand that will correspond with the bed-plate B P. On the inner and surrounding the center of the disks are made circular flanges C F, the upper part of which is recessed out sufficient to regulate or limit the throw of the piston S P, and the lower part provided with openings, which are covered with clack-valves C² and C³, said valves being secured to the part C F of C D. Underneath the center of flanges C F, and extending down to the bed-plate, is a partition, P T, which separates the pump, and allows the valves C, C¹, C², and C³ to act alternately at every throw of the piston. Inside of flanges C F of disk C D' is an opening and discharge-pipe, P'. Immediately in the center of disks C D and C D' are openings, through which passes the axle A, said axle having secured on its center, by means of an arm, a segmental piston, S P. The piston is made in the form of a segment of a circle, and its ends provided with plates, two stationary and two movable. Between the plates are placed packing of rubber, leather, or any other suitable material, and the whole held in place by means of screw-bolts, as shown in Fig. 3.

The disks C D and C D', when joined, are made air-tight by means of packing, and are held together by nuts and bolts, the same process being used also for securing the foot part to the bed-plate B P.

Encircling the axle A, and fitting in the disks C D and C D', through which the said axle passes, are stuffing-boxes to prevent leakage. On the outer side of the axle A is placed a lever and handle, L, one shoulder of which is jointed to allow it to be detached. Said lever is held in place by means of nuts of ordinary construction.

The circumference of the disks C D and C D', or the space which forms the pump-chamber, can be made square, round, oval, or any desired form.

The pump is mounted on a stationary platform, as shown in the drawing, or on a movable truck.

It will be obvious that, centering the lever L on the axle A, and the fulcrum being on a line with the center of the piston, immense power is gained. A pump capable of filling a hose two and one-half inches diameter will be but six and one-half inches from the center of the axle to the center of the segmental piston, and the lever, being three or more feet long above the center of the piston, will enable one man to do more execution than can be done by two on any other pump.

The diameter of the pump for hose of two and one-half inches will be eighteen inches, extreme width, and the pump-chamber five inches, which will make six and one-half inches from the center of the axle to the center of the piston.

I do not claim the use of a rotating or oscillating piston, as such device has been heretofore known and used; but,

Having thus described my invention, what I claim therein as new, and desire to secure by Letters Patent, is—

The segmental piston S P, in combination with the receiving-valves C C¹, partition P T, circular flanges C F, and delivery-valves C² C³, the whole arranged and operating substantially in the manner described.

G. W. ROGERS.

Witnesses:
CHARLES H. EVANS,
ISAAC R. OAKFORD.